(12) United States Patent
Kim

(10) Patent No.: US 10,682,620 B1
(45) Date of Patent: Jun. 16, 2020

(54) SYSTEM FOR RECOVERING ENTRAINED PARTICLES FROM AN EXHAUST GAS STREAM

(71) Applicant: X ENERGY, LLC, Rockville, MD (US)

(72) Inventor: Howard Taery Kim, Knoxville, TN (US)

(73) Assignee: X ENERGY, LLC., Rockville, MD (US)

( * ) Notice: Subject to any disclaimer, the term of this patent is extended or adjusted under 35 U.S.C. 154(b) by 0 days.

(21) Appl. No.: 16/442,156

(22) Filed: Jun. 14, 2019

(51) Int. Cl.
*B01J 8/00* (2006.01)
*B01D 45/08* (2006.01)
*B01J 8/18* (2006.01)

(52) U.S. Cl.
CPC .............. *B01J 8/006* (2013.01); *B01D 45/08* (2013.01); *B01J 8/1827* (2013.01); *B01J 2208/00893* (2013.01); *B01J 2208/00938* (2013.01); *B01J 2208/00991* (2013.01)

(58) Field of Classification Search
CPC ....................... B01J 8/006; B01J 8/1827; B01J 2208/00938; B01J 2208/00991; B01J 2208/00893; B01D 45/08
USPC ........................................................ 422/143
See application file for complete search history.

(56) References Cited

U.S. PATENT DOCUMENTS

| | | | |
|---|---|---|---|
| 2,489,088 A | 1/1940 | Lewis et al. | |
| 2,581,670 A | 7/1947 | Kassel | |
| 2,954,843 A | 7/1957 | Brzeski | |
| 3,273,320 A * | 9/1966 | Delaune | B04C 5/081 55/434.1 |
| 3,290,982 A * | 12/1966 | Marschner | F16B 19/05 411/39 |
| 4,588,790 A * | 5/1986 | Jenkins, III | B01J 8/1809 526/70 |
| 4,874,584 A | 10/1989 | Ruottu | |
| 5,290,431 A * | 3/1994 | Cunningham | B01J 38/06 208/113 |
| 9,162,207 B2 | 10/2015 | Jia et al. | |
| 10,099,190 B2 | 10/2018 | Raboin | |

* cited by examiner

*Primary Examiner* — Huy Tram Nguyen
(74) *Attorney, Agent, or Firm* — Kramer Amado, P.C.

(57) ABSTRACT

Entrained particles from an exhaust gas stream may be removed from the gas stream with a device including a housing having a top, an inner surface, and a bottom with a hole passing therethrough, where the housing further includes an impact surface. An entrance pipe guides the exhaust gas stream into the housing toward the impact surface, and is arranged so that the entrance pipe has an inner diameter x; and the impact surface is separated from the opening of the entrance pipe by a distance y, wherein y is between 3x and ⅓x. An exit pipe guide the exhaust gas stream out of the housing. A receptacle is removably connected to the hole in the bottom of the housing. The impact surface diverts the exhaust gas stream from a first flow direction to a second flow direction, causing the entrained particles to fall from the exhaust gas stream into the receptacle before entering the exit pipe.

20 Claims, 2 Drawing Sheets

SYSTEM FOR RECOVERING ENTRAINED PARTICLES FROM AN EXHAUST GAS STREAM

BACKGROUND

1. Field of the Disclosure

This disclosure relates generally to a system for recovering entrained particles from an exhaust gas stream. In various embodiments, the disclosure relates generally to a device for recovering entrained particles from exhaust gas from a fluidized bed reactor.

2. Description of Related Art

In a fluidized bed reactor, reactant gases are heated and flow through a bed of particles. The react gases, together with an optional diluent or carrier gas, flow through the particles, fluidizing them. The reactant gases may react and deposit a coating layer on the particles in the fluidized bed. The used reactant gases exit the fluidized bed reactor as an exhaust gas stream, and may undesirably carry a portion of the particles in the fluidized bed as entrained particles. In such cases, it is advantageous to recover entrained particles from the exhaust gas stream for reuse or disposal.

Some prior art methods of recovering entrained particles from an exhaust gas stream use centrifugal force, using cyclonic dust collectors. In such dust collectors, particle-laden exhaust gas enters the dust collector through an inlet pipe, is diverted by a helical baffle within the collector. Centrifugal force drives entrained particles to the interior wall of the collector, where the particles fall to the base of the unit. Exhaust gas free of entrained particles is carried through an exhaust pipe along a vertical axis of the dust collector. Such collectors are, however, bulky and subject to wear from abrasion between disentrained particles and the interior wall of the collector.

Other prior art methods for disentraining particles from a gas stream involve use of an upwardly directed inlet pipe for the exhaust gas stream, where the gas stream flows at high velocity. The inlet pipe leads into an enlarged separating chamber, with a vertical partition dividing the separating chamber to form a two chambers. The gas stream is directed toward an upper end of a first chamber, causing the gas stream to impact the upper end of the first chamber and reverse its direction of flow. Impact between particles as the gas stream reverses direction causes entrained particles to fall out of the gas stream. The gas stream then flows toward an exit in the second chamber. However, while this system removes large particles effectively, it does not remove fine particles. Fine particles may remain entrained in the gas stream, flowing into the second chamber and out of the separating chamber. Also, impact between particles in the gas stream and the upper end of the first chamber may lead to unacceptable wear in the separating chamber. To prevent such wear, the end of the inlet pipe and the upper end of the first chamber may need to be separated by several meters. As a result, these devices have very large separating chambers, causing repair or replacement of worn equipment to be time-consuming and costly.

SUMMARY OF THE INVENTION

In light of the present need for improved methods and devices for removing entrained particles from an exhaust gas stream, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Devices for removing entrained particles are preferably compact, and may be easily removed for repair or replacement if worn. Such devices should also have a removable collection chamber, making it easy to recover disentrained particles from the device.

Various embodiments disclosed herein relate to a fluidized bed reactor, comprising a reactor having a gas distribution plate configured to support a fluidized bed, a plenum below the gas distribution plate, a reaction chamber above the gas distribution plate, and an exhaust pipe. The reactor is configured to receive a fluidizing gas in the plenum, and pass the fluidizing gas through the gas distribution plate into the reaction chamber for deposition onto particles within the fluidized bed. The fluidizing gas then into passes into the exhaust pipe as an exhaust gas stream.

In various embodiments, the exhaust pipe leads into a device for removing entrained particles from the exhaust gas stream. The device for removing entrained particles may include a housing having a bottom surface with a hole therethrough, where the housing includes an entrance pipe having an exit and an exit pipe having an entrance. A removable receptacle may be connected to the hole in the bottom surface of the housing. The entrance pipe guides the exhaust gas stream into the housing; and the exit pipe guides the exhaust gas stream out of said housing. The housing further includes a wall between the exit from the entrance pipe and the entrance to the exit pipe. The wall causes the exhaust gas stream to flow in a nonlinear direction between the entrance pipe and the exit pipe, causing the entrained particles to fall from said exhaust gas stream into the receptacle.

In various embodiments, the wall may be a curved or planar structure arranged in the housing between the entrance pipe and the exit pipe. In various embodiments, the wall may not be a separate structure in the housing. In various embodiments, the wall may be an outer surface of the exit pipe, with the exit pipe exiting the housing through an upper housing surface. The exhaust gas stream from the entrance pipe enters the housing, and impacts the outer surface of the exit pipe. The exhaust gas stream is deflected downwardly toward the removable receptacle, and then flows upwardly into the exit pipe. The nonlinear exhaust gas flow causes particles entrained in the exhaust gas stream to disentrain, falling out of the exhaust gas stream into the removable receptacle.

In various embodiments, the wall may be an inner surface of the housing. In various embodiments, the exit pipe and the entrance pipe may be adjacent, with an axis of the exit pipe and an axis of the entrance pipe forming an angle of 90° to 180°, 120° to 180°, 135° to 165°, about 135°, about 155°, or about 180°. The exit pipe and the entrance pipe are arranged so that the entrance to the exit pipe faces a first portion of the inner surface of the housing, while the exit to the entrance pipe faces a second portion of the inner surface of the housing. The exhaust gas stream from the entrance pipe enters the housing, and impacts the second portion of the inner surface of the housing. The exhaust gas stream is deflected along the inner surface of the housing, and then flows into the exit pipe after reaching the first portion of the inner surface of the housing. The nonlinear exhaust gas flow along the housing inner surface causes particles entrained in the exhaust gas stream to disentrain, falling out of the exhaust gas stream into the removable receptacle.

In various embodiments, the wall is an inner surface of the housing, and the exit pipe and the entrance pipe may be parallel and adjacent to each other. The axis of the exit pipe and the axis of the entrance pipe form an angle of 180, and are linearly offset from each other so that the entrance to the exit pipe and the exit to the entrance pipe face opposite portions of the inner surface of the housing. The exhaust gas stream from the entrance pipe enters the housing, and impacts the inner surface of the housing. The exhaust gas stream is deflected along the inner surface of the housing, and then flows along the inner surface of the housing before entering the exit pipe. The nonlinear exhaust gas flow along the housing inner surface causes particles entrained in the exhaust gas stream to fall out of the exhaust gas stream into the removable receptacle.

In various embodiments, the removable receptacle is configured to be removed from the housing, allowing recovery or disposal of particles which fell into the receptacle after disentrainment from the exhaust gas stream. In various embodiments, the removable receptacle has a threaded surface on an external surface of the receptacle, forming a threaded male joint. The internal surface of the hole in the bottom of the housing includes a threaded female joint. The threaded male joint on the receptacle may be removably screwed into the threaded female joint on the housing. In other embodiments, a ridge is positioned on an external surface of the receptacle, near a receptacle opening. The ridge may snap into a groove on an internal surface of the hole in the bottom of the housing, removably securing the receptacle to the housing.

Various embodiments disclosed herein relate to a fluidized bed reactor, comprising a reactor having a gas distribution plate configured to support a fluidized bed, a plenum below the gas distribution plate, a reaction chamber above the gas distribution plate, and an exhaust pipe. The reactor receives a fluidizing gas in the plenum, and pass the fluidizing gas through the gas distribution plate into the reaction chamber through a bed of particles supported on the gas distribution plate. The fluidizing gas fluidizes the particles in the bed. The fluidizing gas may include one or more reactant gases, which react to form a coating on the fluidized particles. The fluidizing gas then enters the exhaust pipe as an exhaust gas stream. The fluidized bed reactor also includes a device for removing entrained particles from the exhaust gas stream, which comprises a housing having a bottom with a hole therethrough. In various embodiments, the housing comprises an entrance pipe having an opening. The entrance pipe is configured to guide the exhaust gas stream from the exhaust pipe into the housing. An exit pipe extending from the housing has an entrance, where the exit pipe is configured to guide the exhaust gas stream out of the housing. In various embodiments, there is a wall between the exit from the entrance pipe and the entrance to the exit pipe. The opening of the entrance pipe is directed toward said wall and separated from the wall by a distance y, wherein y is between 3x and ⅓x, between 2x and ½x, or less than or equal to x, and x is the inner diameter of the entrance pipe in the housing.

In various embodiments, a receptacle is removably connected to the hole in the bottom of the housing. The wall in the housing is configured to cause said exhaust gas stream to flow through the housing in a nonlinear direction between the entrance pipe and said exit pipe, causing entrained particles in the exhaust gas stream to fall from into the receptacle.

In various embodiments, the device for removing entrained particles from the exhaust gas stream may be used in conjunction with another mechanism for removing entrained particles. In various embodiments, the fluidized bed reactor comprises a disentrainment chamber above the reaction chamber, where the disentrainment chamber is configured to reduce the velocity of the fluidizing gas from the reaction chamber. The reactor is configured to pass the fluidizing gas through the reaction chamber into the disentrainment chamber, and then into the exhaust pipe as an exhaust gas stream. The disentrainment chamber causes entrained particles in the fluidizing gas to fall from the fluidizing gas into the fluidized bed supported on the gas distribution plate. The device for removing entrained particles causes entrained particles in the exhaust gas stream to fall from the exhaust gas stream into the removable receptacle for disposal or recovery. In various embodiments, the reaction chamber has a first diameter and the disentrainment chamber has a second diameter, the second diameter being from 2 to 10 times, from 2 to 5 times, from 2.5 to 4 times, or about 2.5 times greater than the first diameter. In various embodiments, the disentrainment chamber reduces the velocity of fluidizing gas passing from the reaction chamber into the disentrainment chamber. In various embodiments, the disentrainment chamber may reduce the velocity of fluidizing gas by a factor of about 5 to about 50, about 6 to 40, about 7 to 30, about 8 to 20, about 9 to 15, or about 10. The reduction of fluidizing gas velocity in the disentrainment chamber reduces the buoyancy of entrained particles from the fluidized bed in the fluidizing gas, causing larger entrained particles to fall back into the fluidized bed of the reactor. Entrained fine particles may pass out of the disentrainment chamber in the exhaust gas stream. The device for removing entrained particles from the exhaust gas stream may then be used to recover these entrained fine particles.

BRIEF DESCRIPTION OF THE DRAWINGS

In order to better understand various exemplary embodiments, reference is made to the accompanying drawings, wherein.

DETAILED DESCRIPTION

Figure 1:
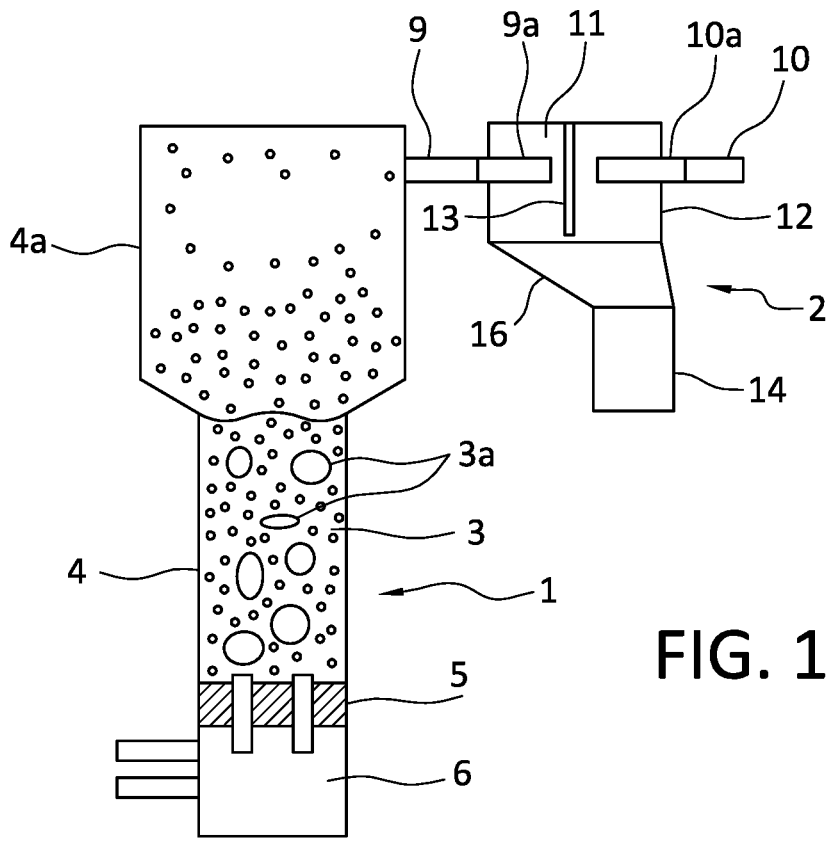
FIG. 1 shows a fluidized bed reactor having an exhaust gas pipe, where the exhaust gas pipe leads to an apparatus for removing entrained particles from an exhaust gas stream.

Referring now to the drawings, in which like numerals refer to like components or steps, there are disclosed broad aspects of various exemplary embodiments. FIG. 1 shows a system comprising a fluidized bed reactor 1 and a device 2 for recovering entrained particles from an exhaust gas stream exiting the reactor 1.

Fluidized bed reactor 1 includes a plenum 6; a gas distribution plate 5 above the plenum; and a reaction chamber 4 above the gas distribution plate. Reaction chamber 4 contains a bed of particles 3. A flow of a reactant gas, a diluent gas, or a mixture thereof enters plenum 6 through at least one gas entrance 7, and is mixed in plenum 6. Mixed gas flows through passages 8 into reaction chamber 4, passing through the particle bed 3. As the gas passes through particle bed 3, bubbles of gas 3a may form as the bed becomes fluidized. Some of the particles in the fluidized bed 4 may become entrained in the gas flow. The fluidized bed reactor may include reaction chamber 4 having a first diameter, and a disentrainment chamber 4a having a second diameter, where the second diameter is from 2 to 10 times, from 2 to 5 times, from 2.5 to 4 times, or about 2.5 times greater than the first diameter. As the mixed gas exits the reaction chamber and enters the disentrainment chamber, the gas velocity decreases, reducing a buoyant force supporting entrained particles and causing larger particles in the gas stream to disentrain and fall back into fluidized bed 3. An exhaust gas stream containing entrained fine particles exits the reactor through exhaust pipe 9.

The device 2 for recovering entrained particles includes a chamber 11, a receptacle for receiving entrained particles 14, and may include a funnel section 16. Entrance pipe 9a receives the exhaust gas stream from exhaust pipe 9, and passes the exhaust gas stream into chamber 11. The exhaust gas stream then flows into chamber 12. Exit pipe 10a carries the exhaust gas stream out of chamber 12 into a second exhaust pipe 10. An impact surface or other wall 13 between chambers 11 and 12 causes the exhaust gas stream to flow in a nonlinear path between entrance pipe 9a and exit pipe 10a, with entrained fine particles dropping out of the exhaust gas stream as it flows along this nonlinear path. Funnel section 16 carries these disentrained particles, and guides them into receptacle 14. Disentrained particles may be recovered or disposed of by detaching receptacle 14 from device 2 and emptying the receptacle.

Figure 2:
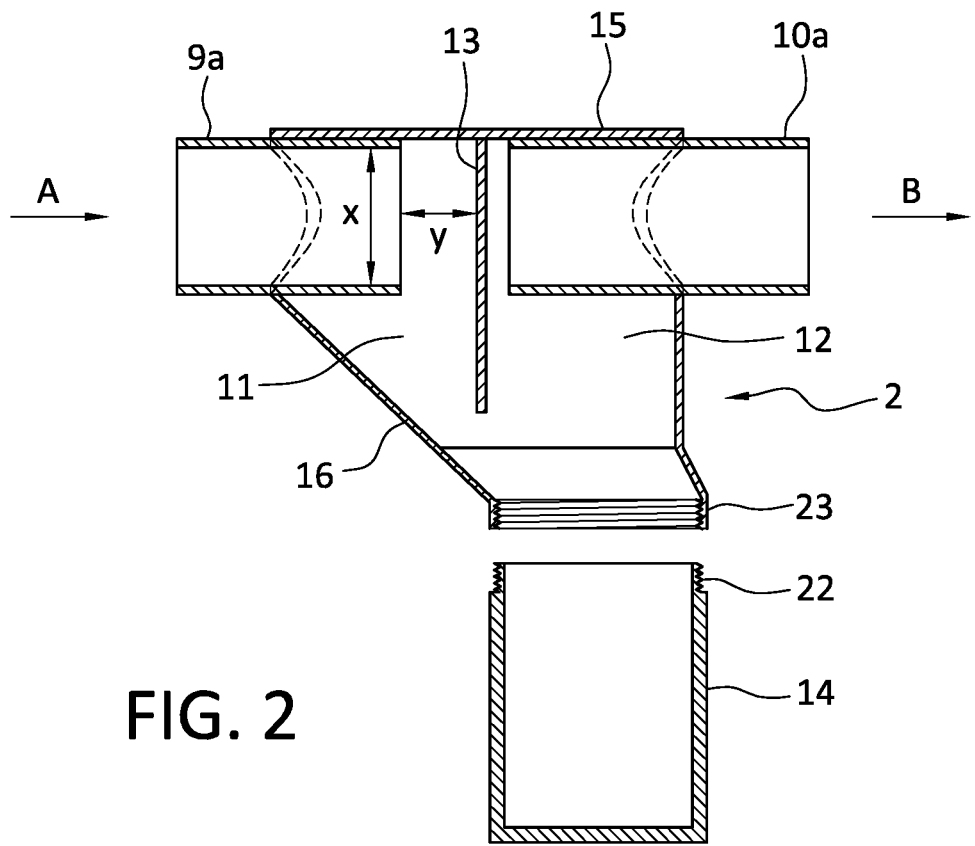
FIG. 2 shows a first embodiment of an apparatus for removing entrained particles from an exhaust gas stream.

A first embodiment of device 2 for recovering entrained particles is shown in FIG. 2. Device 2 contains a housing 15 and a receptacle 14 attached to housing 15. A threaded male joint 22 on an outer surface of receptacle 14 may be connected to an opening 23 with a threaded female joint on the bottom of housing 15. Entrance pipe 9a receives an exhaust gas stream in the direction of arrow A, and guides the exhaust gas stream into chamber 11. An impact surface or other wall 13 is mounted at a side of chamber 11, opposing an exit opening from entrance pipe 9a. Entrance pipe 9a has an inner diameter x, and a distance from the exit opening of entrance pipe 9a to wall 13 is y, where y is between 3x and ⅓x. The exhaust gas stream enters chamber 11, and contacts wall 13 and is deflected downwards toward receptacle 14. The exhaust gas stream then flows upwards into chamber 12. Exit pipe 10a carries the exhaust gas stream out of chamber 12, in the direction of arrow B. The impact surface or other wall 13 causes the exhaust gas stream to flow in a nonlinear path between entrance pipe 9a and exit pipe 10a around wall 13, with entrained fine particles dropping out of the exhaust gas stream as it flows along this nonlinear path. Funnel section 16 receives these dis entrained particles, and guides them into receptacle 14 in the direction of arrow C. Disentrained particles may be recovered or disposed of by unscrewing receptacle 14 from device 2 and emptying the receptacle.

Without being bound by any theory, it is believed disentrainment of particles results in part from impact between entrained particles and wall 13, with such impacts reducing kinetic energy of the entrained particles. Further, inertial forces also cause disentrainment of particles. The exhaust gas stream impacts wall 13, and is deflected downwards towards container 14. After passing wall 13, the exhaust gas stream and is deflected downwards along wall 13, towards exit 10a. The gas stream is then deflected upwards along wall 13, into chamber 12. Due to inertia, particles traveling downwards along wall 13 tend to continue moving downward in the direction of arrow C, falling onto the inner surface of funnel section 16, which guides the disentrained particles toward receptacle 14.

Figure 3:
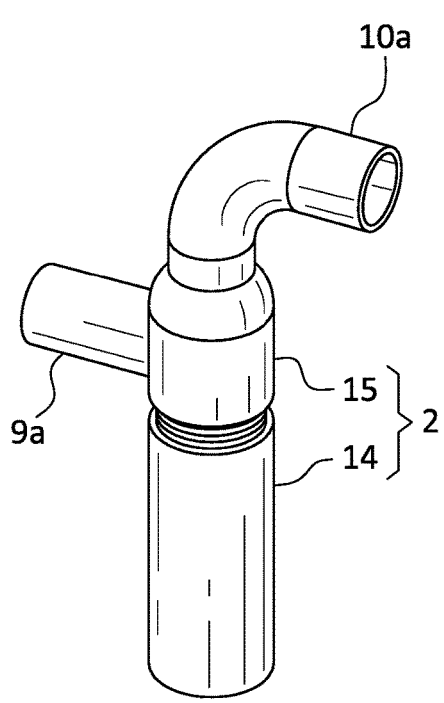
FIGS. 3 and 4 show a second embodiment of an apparatus for removing entrained particles from an exhaust gas stream.

FIG. 3 shows a perspective view of a second embodiment of the device 2 for recovering entrained particles. Device 2 contains a housing 15 and a receptacle 14 attached to housing 15, connected together by threaded joints. There is no funnel section 16 in this embodiment. Entrance pipe 9a carries an exhaust gas stream into housing 15; and exit pipe 10a carries the exhaust gas stream out of housing 15.

Figure 4:
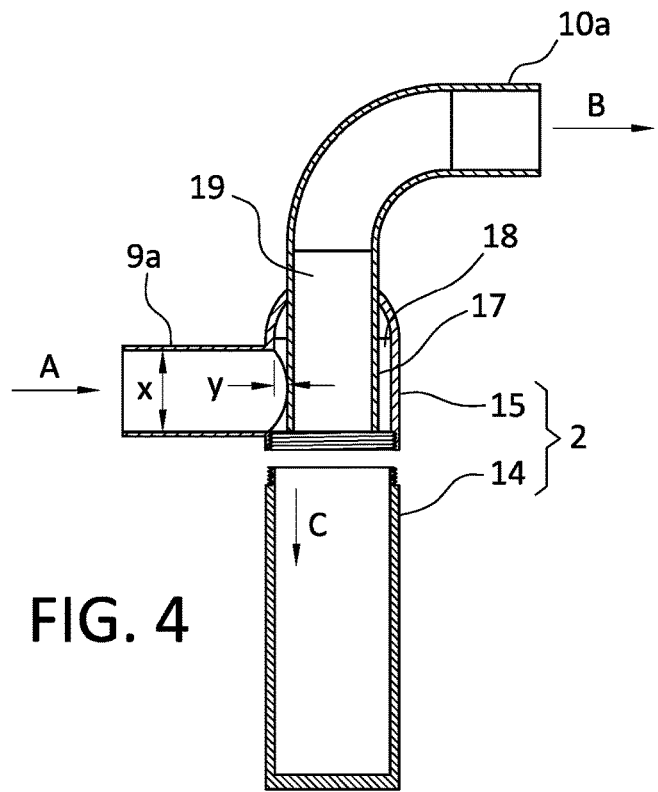

FIG. 4 shows a cross section of the device of FIG. 3. Entrance pipe 9a receives an exhaust gas stream in the direction of arrow A, and guides the exhaust gas stream into chamber 18, formed by an inner surface of the external wall of housing 15 and an outer surface 17 of exit pipe 10a. The outer surface 17 of exit pipe 10a constitutes an impact surface or wall in housing 10a. Entrance pipe 9a has an inner diameter x, and a distance from the exit opening of entrance pipe 9a to outer surface 17 of exit pipe 10a is y, where y is between 3x and ⅓x. The exhaust gas stream enters chamber 18 in the direction of arrow A, and contacts pipe 10a and is deflected downwards toward receptacle 14 in the direction of arrow C. The exhaust gas stream then flows upwards into the interior 19 of pipe 10a, and exits housing 15, in the direction of arrow B. The impact surface or other wall 13 causes the exhaust gas stream to flow in a nonlinear path between entrance pipe 9a and exit pipe 10a around wall 13, with entrained fine particles dropping out of the exhaust gas stream as it flows along this nonlinear path, making a 180° turn as it enters interior 19. Entrained particles drop out of the exhaust gas flow as the exhaust gas flows around outer surface 17 of exit pipe 10a into the interior 19 of exit pipe 10a. The disentrained particles drop into receptacle 14, and may be recovered or disposed of by unscrewing receptacle 14 from device 2 and emptying the receptacle.

Figure 5:
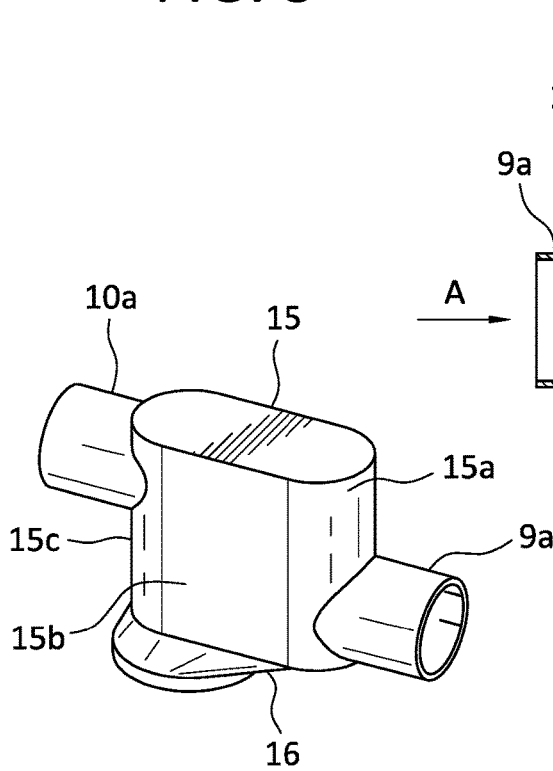
FIGS. 5 and 6 show a third embodiment of an apparatus for removing entrained particles from an exhaust gas stream.

FIG. 5 shows a perspective view of a second embodiment of the housing 15 of device 2 for recovering entrained particles. Entrance pipe 9a carries an exhaust gas stream into housing 15; and exit pipe 10a carries the exhaust gas stream out of housing 15; pipes 9a and 10a are arranged in a side-by-side configuration. Entrance pipe 9a enters a first semicylindrical end 15a of housing 15, and exit pipe 10a leaves through a second semicylindrical end 15c of housing 15. Semicylindrical ends 15a are connected by a central housing portion 15b having planar housing surfaces. Funnel section 16 is positioned at the bottom of housing 15.

Figure 6:
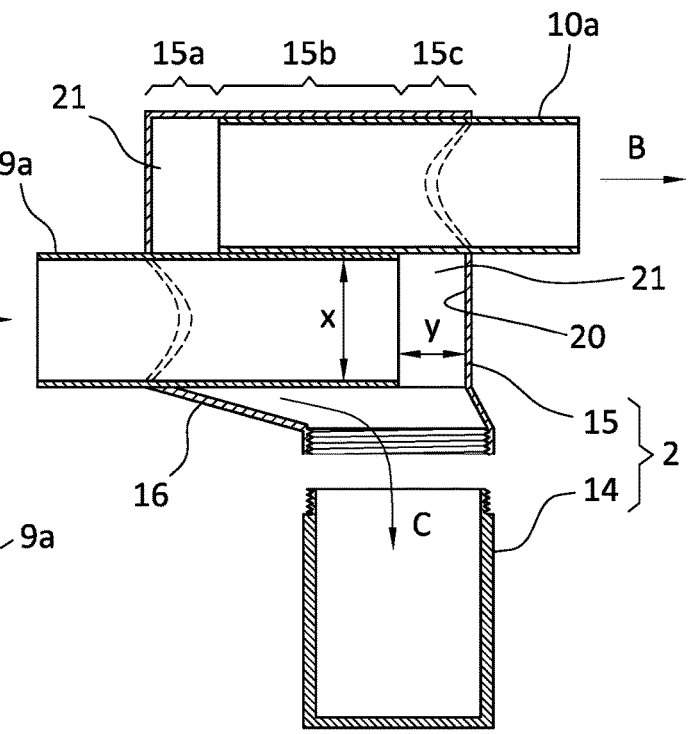

FIG. 6 shows a cross section of the device of FIG. 5. As seen in FIG. 5, entrance pipe 9a enters through a first semicylindrical end 15a of housing 15, traverses a central portion 15b of housing 15, where central portion 15 is bounded by planar surfaces, and has an exit opening at the end of central portion 15b the exhaust gas then flows into semicylindrical end 15c. The inner surface of semicylindrical end 15c serves as a wall or impact surface, and deflects the exhaust flow along an outer surface of pipe 9a, reversing its direction of flow. The exhaust gas then flows into the first Semicylindrical end 15a, along the outer surface of pipe 9a, and enters exit pipe 10a, reversing its direction of flow a second time. Exit pipe 10a carries the exhaust gas through central portion 15b and semicylindrical end 15c of the housing, before exiting the housing in the direction of arrow B. A first portion of entrained particles falls out of the exhaust gas flow as the exhaust gas exits the pipe 9a and reverses its direction of flow. A second portion of entrained particles falls out of the exhaust gas flow as the exhaust gas enters pipe 10*a* reversing its direction of flow a second time. As the particles fall out of the exhaust gas flow, they fall into funnel section 16 and then into receptacle 14, in the direction of arrow C.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device for removing entrained particles from an exhaust gas stream, comprising:
   a. a housing having a top, an inner surface, and a bottom with a hole passing therethrough, said housing further comprising:
      an impact surface dividing the housing into a first chamber and a second chamber;
      an entrance pipe having an opening opposed to the impact surface, said entrance pipe being configured to guide said exhaust gas stream into said first chamber toward said impact surface, said entrance pipe having an inner diameter x; and
      an exit pipe configured to guide said exhaust gas stream out of said second chamber;
      said impact surface being separated from the opening of the entrance pipe by a distance y, wherein y is between 3x and ⅓x; and
   b. a receptacle removably connected to the hole in the bottom of the housing;
   wherein the impact surface is configured to divert said exhaust gas stream from a first flow direction to a second flow direction around the impact surface, causing the entrained particles to fall from said exhaust gas stream into said receptacle before entering the exit pipe.

2. The device of claim 1, wherein x is greater than or equal to y.

3. The device of claim 1, wherein the receptacle is configured to be removed from the housing, allowing recovery or disposal of the entrained particles.

4. The device of claim 1, wherein a threading on an external surface of the receptacle screws into a threading on an internal surface of the hole in the bottom of the housing.

5. The device of claim 1, wherein a ridge on an external surface of the receptacle snaps into a groove on an internal surface of the hole in the bottom of the housing.

6. A device for removing entrained particles from an exhaust gas stream, comprising:
   a. a housing having a top, an inner surface, and a bottom with a hole passing therethrough, said housing further comprising:
      an entrance pipe having an opening, said entrance pipe being configured to guide said exhaust gas stream into said housing, said entrance pipe having an inner diameter x; and
      an exit pipe configured to guide said exhaust gas stream out of said housing; and
      an impact surface opposed to the opening in the entrance pipe, said impact surface being separated from the opening of the entrance pipe by a distance y, wherein y is between 3x and ⅓x;
   b. a receptacle removably connected to the hole in the bottom of the housing;
   wherein the exit pipe has an inner surface and an outer surface, and exits the housing through the top, said outer surface being said impact surface;
   wherein the opening in the entrance pipe is directed toward the impact surface, and the impact surface is configured to divert said exhaust gas stream from a first flow direction i) downwards toward the receptacle, and then ii) upwards into the exit pipe, causing the entrained particles to fall from said exhaust gas stream into said receptacle before entering the exit pipe.

7. A fluidized bed reactor, comprising
   a reactor having a gas distribution plate configured to support a fluidized bed, a plenum below the gas distribution plate, a reaction chamber above the gas distribution plate, and an exhaust pipe;
      wherein the reactor is configured to receive a fluidizing gas in the plenum, and pass the fluidizing gas through the gas distribution plate into the reaction chamber, and then into the exhaust pipe as an exhaust gas stream;
   said fluidized bed reactor further comprising:
      a device of claim 6 for removing entrained particles from the exhaust gas stream.

8. A device for removing entrained particles from an exhaust gas stream, comprising:
   a. a housing having a top, an inner surface, and a bottom with a hole passing therethrough, said housing further comprising:
      an impact surface, said impact surface being separated from the opening of the entrance pipe by a distance y, wherein y is between 3x and 13x;
      an entrance pipe having an opening, said entrance pipe being configured to guide said exhaust gas stream into said housing toward said impact surface, said entrance pipe having an inner diameter x; and
      exit pipe configured to guide said exhaust gas stream out of said housing;
   b. a receptacle removably connected to the hole in the bottom of the housing;
   wherein the entrance pipe and the exit pipe are parallel to each other, said entrance pipe having an exit opening near said inner surface of said housing, said inner surface of said housing being said impact surface;
   said exit pipe having an entrance opening near said inner surface of said housing;
   said exit opening being linearly offset from said entrance opening; said entrance pipe and said exit pipe being configured so that the exhaust gas stream enters the housing through the exit opening of the entrance pipe, flows along the inner surface of the housing, and enters the exit pipe through the entrance opening, causing the entrained particles to fall from said exhaust gas stream into said receptacle before entering the exit pipe.

9. A fluidized bed reactor, comprising
   a reactor having a gas distribution plate configured to support a fluidized bed, a plenum below the gas distribution plate, a reaction chamber above the gas distribution plate, and an exhaust pipe;
      wherein the reactor is configured to receive a fluidizing gas in the plenum, and pass the fluidizing gas through the gas distribution plate into the reaction chamber, and then into the exhaust pipe as an exhaust gas stream;

said fluidized bed reactor further comprising:
 a device of claim 5 for removing entrained particles from the exhaust gas stream.

10. A device for removing entrained particles from an exhaust gas stream, comprising:
 a. a housing having a top, an inner surface, and a bottom with a hole passing therethrough, said housing further comprising
  an entrance pipe having an opening, said entrance pipe being configured to guide said exhaust gas stream into said housing, said entrance pipe having an inner diameter x;
  an exit pipe having an entrance, said exit pipe being configured to guide said exhaust gas stream out of said housing;
  a wall between the exit from the entrance pipe and the entrance to the exit pipe and opposed to the exit from the entrance pipe, said opening of the entrance pipe being i) directed toward the wall, and ii) separated from the wall by a distance y, wherein y is between 3x and ⅓x; and
 b. a receptacle removably connected to the hole in the bottom of the housing;
 said wall being configured to cause said exhaust gas stream to flow in a nonlinear direction around the wall between said entrance pipe and said exit pipe, causing the entrained particles to fall from said exhaust gas stream into said receptacle.

11. The device of claim 10, wherein x is greater than or equal to y.

12. The device of claim 10, wherein a threading on an external surface of the receptacle screws into a threading on an internal surface of the hole in the bottom of the housing.

13. The device of claim 10, wherein a ridge on an external surface of the receptacle snaps into a groove on an internal surface of the hole in the bottom of the housing.

14. A fluidized bed reactor, comprising
 a reactor having a gas distribution plate configured to support a fluidized bed, a plenum below the gas distribution plate, a reaction chamber above the gas distribution plate, and an exhaust pipe;
  wherein the reactor is configured to receive a fluidizing gas in the plenum, and pass the fluidizing gas through the gas distribution plate into the reaction chamber, and then into the exhaust pipe as an exhaust gas stream;
 said fluidized bed reactor further comprising:
 a device of claim 10 for removing entrained particles from the exhaust gas stream.

15. The fluidized bed reactor of claim 14, wherein x is greater than or equal to y.

16. The fluidized bed reactor of claim 14, further comprising:
 a disentrainment chamber above the reaction chamber, said disentrainment chamber being configured to reduce the velocity of the fluidizing gas from the reaction chamber;
 wherein the reactor is configured to pass the fluidizing gas through the reaction chamber into the disentrainment chamber, and then into the exhaust pipe as an exhaust gas stream;
 said disentrainment chamber being configured to cause entrained particles in the fluidizing gas to fall from said fluidizing gas into said fluidized bed;
 said device for removing entrained particles being configured to cause entrained particles in the exhaust gas stream to fall from said exhaust gas stream into said receptacle.

17. The fluidized bed reactor of claim 16, wherein the reaction chamber has a first diameter and the disentrainment chamber has a second diameter, said second diameter being from two to ten times greater than the first diameter.

18. The fluidized bed reactor of claim 16, wherein the reaction chamber has a first diameter and the disentrainment chamber has a second diameter, said second diameter being from two to five times greater than the first diameter.

19. The fluidized bed reactor of claim 16, wherein the reaction chamber has a first diameter and the disentrainment chamber has a second diameter, said second diameter being about 2.5 times greater than the first diameter.

20. A device for removing entrained particles from an exhaust gas stream, comprising:
 a. a housing having a first diameter, the housing comprising a top, an inner surface, and a bottom with a hole passing therethrough, said housing further comprising:
  an impact surface;
  an entrance pipe having an opening, said entrance pipe being configured to guide said exhaust gas stream into said housing toward said impact surface, said entrance pipe having an inner diameter x; and
  an exit pipe configured to guide said exhaust gas stream out of said housing; and
  said impact surface being separated from the opening of the entrance pipe by a distance y, wherein y is between 3x and ⅓x;
 b. a receptacle having a second diameter, the receptacle being removably connected to the hole in the bottom of the housing, the second diameter being equal to the first diameter;
 wherein the exit pipe has an inner surface and an outer surface, and exits the housing through the top, said outer surface being said impact surface; wherein the opening in the entrance pipe is directed toward the impact surface, and the impact surface is configured to divert said exhaust gas stream from a first flow direction
  i) downwards toward the receptacle, and then
  ii) upwards into the exit pipe, causing the rained particles to fall from said exhaust gas stream into said receptacle before entering the exit pipe.

* * * * *

UNITED STATES PATENT AND TRADEMARK OFFICE
CERTIFICATE OF CORRECTION

| | | |
|---|---|---|
| PATENT NO. | : 10,682,620 B1 | Page 1 of 1 |
| APPLICATION NO. | : 16/442156 | |
| DATED | : June 16, 2020 | |
| INVENTOR(S) | : Howard Taery Kim | |

It is certified that error appears in the above-identified patent and that said Letters Patent is hereby corrected as shown below:

In the Specification

On Column 1, Line 4, before the "Background," please insert the following paragraph:
--STATEMENT OF GOVERNMENT SUPPORT
This invention was made with government support under Grant No. DE-NE0008472 awarded by the Department of Energy. The government has certain rights in the invention.--

Signed and Sealed this
Second Day of February, 2021

Drew Hirshfeld
*Performing the Functions and Duties of the
Under Secretary of Commerce for Intellectual Property and
Director of the United States Patent and Trademark Office*